(No Model.)
T. H. BROWN.
SKELETON SPEED VEHICLE.
No. 297,348. Patented Apr. 22, 1884.
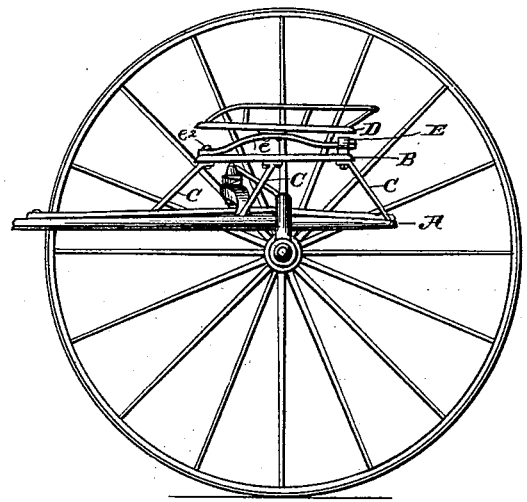
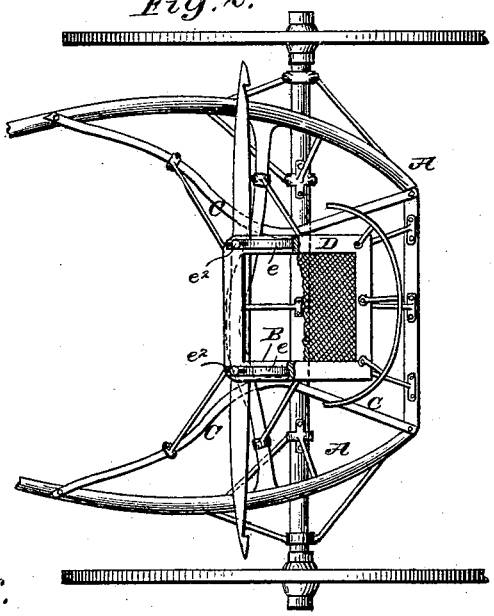
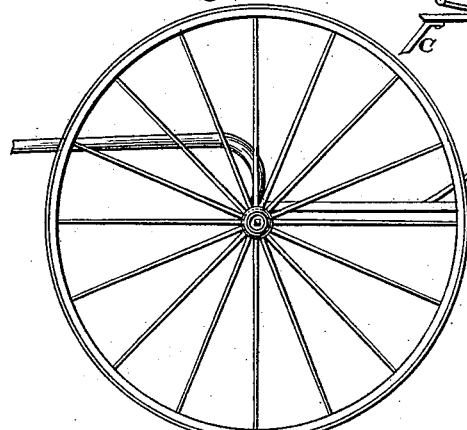
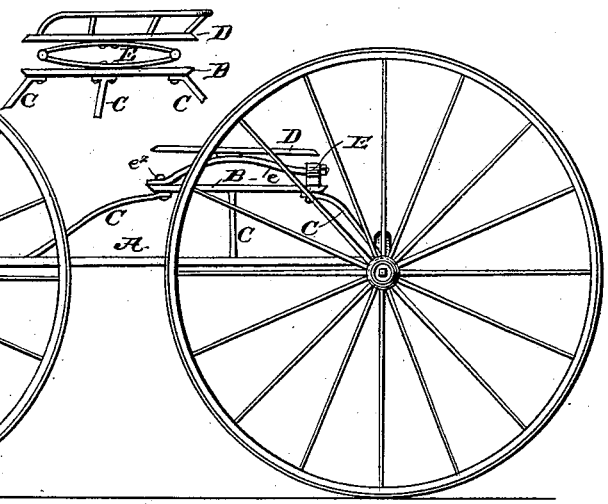
Witnesses:
Jno. W. Brockett
C. C. Poole
Inventor:
Thomas H. Brown
by M. E. Dayton
Attorney

United States Patent Office.

THOMAS H. BROWN, OF CHICAGO, ILLINOIS.

SKELETON SPEED-VEHICLE.

SPECIFICATION forming part of Letters Patent No. 297,348, dated April 22, 1884.

Application filed January 3, 1884. (No model.)

*To all whom it may concern:*

Be it known that I, THOMAS H. BROWN, of Chicago, in the county of Cook and State of Illinois, have invented certain new and useful Improvements in Skeleton Speed Wagons and Sulkies; and I do hereby declare that the following is a full, clear, and exact description thereof, reference being had to the accompanying drawings, and to the letters of reference marked thereon, which form a part of this specification.

This invention relates to the application of springs to the seats of skeleton speed wagons and sulkies.

In the construction of skeleton speed wagons and sulkies it has been the aim of improvement to produce a vehicle of the utmost lightness, and at the same time of the greatest possible rigidity, the lightness being necessary to the attainment of the greatest speed, and the rigidity being necessary to the same end by permanently holding the parts in their proper relations when subjected to the strain incident to the high speed referred to. These apparently incompatible objects are practically accomplished in a high degree, in the later form and now approved vehicles of the class referred to, by means of carefully-studied and judiciously-arranged systems of bracing. In these systems of bracing the seat forms an important element. It is the experience of drivers who use such vehicles, as now more rigidly constructed than formerly and driven at the higher speeds more recently attained, that the exercise of long-continued or constant riding is very severe and wearing upon the driver. It is the object of this invention to combine with the rigid structure forming the skeleton body of the vehicle a yielding or spring-supported seat, by which the exhausting and injurious effects upon the driver may be avoided without lessening his security in place or his safety while driving, and without sacrifice of rigidity in the structure or material increase in the weight of the vehicle.

The nature of the invention will be more fully understood by referring to the accompanying drawings and the following full description thereof.

In the drawings, Figure 1 is a side elevation of a speeding or exercising sulky, having the near wheel removed, and containing my improvement. Fig. 2 is a plan view of a similar vehicle, also containing my improvement. Fig. 3 is a side elevation of a skeleton speed-wagon provided with my improvement. Figs. 4 and 5 are perspective views, showing different forms of springs as applied to a seat and subjacent frame, which latter forms a part of the bracing of the vehicle. Fig. 6 is a side elevation of still another form of spring applied to the seat and subjacent parts in accordance with my improvement.

A represents the skeleton body of a sulky or speed-wagon; B, an elevated frame occupying substantially the usual position of the seat as the latter has heretofore been constructed, and C C a suitable system of bracing connecting the frame B with the subjacent portions of the skeleton body.

D is a seat proper, supported from the frame B by an interposed system of springs, E.

The frame B is a rigid structure, preferably made of four pieces of wood securely joined to each other at their ends, to give the requisite strength and lightness. This frame B is supported at a suitable elevation a few inches lower than that occupied by the seat proper in this case, or lower than the same frame has heretofore been supported when it formed a part of the seat itself. It is connected with the skeleton body A by means of any suitable system of bracing, C C, generally similar to the braces heretofore employed for supporting a rigid seat. By reason of the lower position occupied by the frame B the braces C are shortened correspondingly, and if the same lower points of their attachment are preserved they are also less inclined from the horizontal plane of such lower attachment, and are thereby made to impart greater rigidity and strength to the body, and are of course lightened to the extent that they are shortened.

The seat D is usually an open frame, similar to the frame B, and of dimensions corresponding with the latter, and is provided commonly with a cane bottom. Between the two frames D and B are interposed springs E, which may be of any desired or suitable form to allow the seat to yield vertically, while at the same time holding said seat laterally in its proper position over the frame B. In Fig. 4 the springs employed for this purpose are shown as being composed of three half-elliptical parts or leaves, $e$ $e$ and $e^4$. The spring $e^4$ is centrally secured, preferably, to the rear bar of the frame B, and the leaves $e$ are centrally secured in a similar manner to the side bars of the frame D. One end of each of the springs $e$ $e$ connects with the spring $e^4$, and for this purpose they are provided with shanks $e^3$, which extend through eyes $e^5$, and upon their protruding ends receive the retaining-nuts $e^9$. The opposite ends of the said springs $e$ are slotted at $e'$, and guide-bolts $e^2$ pass through said slots into the frame B. By these connections of the springs the seat D is retained laterally in place. In Fig. 5 the springs E are of steel wire, centrally coiled at $e^6$, and have their ends $e^7$ pivotally retained upon the frames B and D by means of staples or eyes $e^8$. In Fig. 6 two elliptical side springs are employed, being centrally secured to the frames B and D. Figs. 1, 2, and 3 illustrate the construction and arrangement of springs, shown more plainly than in Fig. 4.

I do not wish to be restricted to any particular form of springs interposed between the frames B and D, inasmuch as either of the forms shown, or as other forms not indicated, may be successfully employed in this position.

The material added to the structure described is embraced in the springs interposed between the frames B and D and in one of these frames. As a compensation for the addition of this material, the braces C are shortened and proportionately lightened, so that the improved construction involves but little, if any, increased weight in the vehicle. On the other hand, the advantages obtained are increased rigidity in the body in consequence of the shortening of the braces C and the lower position of the connecting-frame B, together with the yielding or spring-supported seat, which renders the use of the vehicle far more comfortable and less wearing upon the driver.

I am aware that spring-seats in other vehicles are not new, and that portable spring-seats composed of upper and lower parts and intervening springs have been known. I therefore do not claim these devices, broadly, but limit myself to skeleton vehicles in which the part B is permanently and rigidly fixed to the seat-braces.

I claim as my invention—

The combination, with the skeleton body and inclined seat-braces, of a fixed frame, B, secured to said braces, a vertically-movable seat, and springs supporting the seat and connecting it with the frame B, substantially as and for the purpose set forth.

In testimony that I claim the foregoing as my invention I affix my signature in presence of two witnesses.

THOMAS H. BROWN.

Witnesses:
 M. E. DAYTON,
 OLIVER E. PAGIN.